United States Patent
Ro et al.

(10) Patent No.: US 9,378,533 B2
(45) Date of Patent: Jun. 28, 2016

(54) CENTRAL PROCESSING UNIT, GPU SIMULATION METHOD THEREOF, AND COMPUTING SYSTEM INCLUDING THE SAME

(75) Inventors: Won Woo Ro, Seoul (KR); Karam Park, Busan (KR); Yun Ho Oh, Seoul (KR); Sang Peel Lee, Seoul (KR); Minwoo Kim, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 398 days.

(21) Appl. No.: 13/811,436

(22) PCT Filed: Dec. 28, 2010

(86) PCT No.: PCT/KR2010/009416
§ 371 (c)(1),
(2), (4) Date: Mar. 19, 2013

(87) PCT Pub. No.: WO2012/011644
PCT Pub. Date: Jan. 26, 2012

(65) Prior Publication Data
US 2013/0207983 A1    Aug. 15, 2013

(30) Foreign Application Priority Data

Jul. 22, 2010 (KR) .......................... 10-2010-0071036

(51) Int. Cl.
*G06T 1/20* (2006.01)
*G06F 9/50* (2006.01)
(52) U.S. Cl.
CPC ............... *G06T 1/20* (2013.01); *G06F 9/5027* (2013.01)

(58) Field of Classification Search
CPC ........................................................ G06T 1/20
See application file for complete search history.

(56) References Cited

U.S. PATENT DOCUMENTS

| 8,274,518 B2 | 9/2012 | Blythe | |
| 8,537,169 B1* | 9/2013 | Bolz et al. | 345/522 |
| 2003/0037194 A1* | 2/2003 | Mukherjee | 710/260 |
| 2006/0242618 A1 | 10/2006 | Wang et al. | |

(Continued)

FOREIGN PATENT DOCUMENTS

| KR | 10-2009-0065133 A | 6/2009 |
| KR | 10-2010-006821 A | 1/2010 |

OTHER PUBLICATIONS

Shen, S. et al., "Full system simulation with QEMU: an approach to multi-view 3D GPU design", In:2010 IEEE International symposium on circuits and systems (ISCAS), May 30, 2010-Jun. 2, 2010, pp. 3877-3880.

(Continued)

*Primary Examiner* — Joni Richer
*Assistant Examiner* — Grace Q Li
(74) *Attorney, Agent, or Firm* — Carter, DeLuca, Farrell & Schmidt, LLP

(57) ABSTRACT

A central processing unit (CPU) according to embodiments of the inventive concept may include an upper core allocated with a main thread and a plurality of lower cores, each of the plurality of the lower cores being allocated with at least one worker thread. The worker thread may perform simulation operations on operation units of a graphic processing unit (GPU) to generate simulation data, and the main thread may generate synchronization data based on the generated simulation data.

15 Claims, 9 Drawing Sheets

(56) References Cited

U.S. PATENT DOCUMENTS

| | | | |
|---|---|---|---|
| 2008/0024490 A1* | 1/2008 | Loop | G06T 15/40 345/421 |
| 2009/0251469 A1* | 10/2009 | Cohen | 345/473 |
| 2010/0269103 A1* | 10/2010 | Wu et al. | 717/146 |
| 2010/0274519 A1 | 10/2010 | Marcinno | |
| 2011/0243433 A1* | 10/2011 | Fagg et al. | 382/165 |

OTHER PUBLICATIONS

Corporaal, H. et al. "MOVE: a framework for high-performance processor design" In:the 1991 ACM/IEEE conference on supercomputing, 1991, pp. 692-701.

International Search Report mailed Aug. 30, 2011 issued in corresponding application No. PCT/KR2010/009416.

\* cited by examiner

CENTRAL PROCESSING UNIT, GPU SIMULATION METHOD THEREOF, AND COMPUTING SYSTEM INCLUDING THE SAME

TECHNICAL FIELD

The inventive concept relates to a central processing unit performing GPU simulation, a GPU simulation thereof, and a computing system including the same.

BACKGROUND ART

Recently, advanced computer applications become more and more complex, and there are increasing demands on systems for processing these applications. Thus, requirement for higher computational throughput is increasing. Especially, in graphic applications, steps of data access, data operation, and data manipulation should be performed numerous times in a short time in order to realize desired visual effects. Accordingly, improved data processing ability is required for graphic applications. Especially, real-time multimedia applications need a fast processing speed of several Gigabits per second.

A graphic processing unit (GPU), which was developed to accelerate 2D or 3D graphic computations, is one of special-purpose computing processors that are optimized for graphic computations. As graphic-related computations become delicate and complex, modern GPUs are developed to have a structure resembling a multi-core central process unit (CPU). Further, due to this feature, general purpose GPU (GPGPU), in which GPU is used to realize a general purpose computation, like as CPU, is being developed.

In graphic processing, large computations should be processed simultaneously, but such computations have low mutual dependence on each other often. The GPU resembling a multi-core CPU is effective in performing computations with low mutual dependence in a parallel manner.

GPU simulators and source code dynamic analysis tools are required to model GPUs effectively, to improve performance of GPUs, and to develop novel GPUs. Due to such requirement, GPU simulators and source code dynamic analysis tools are being actively developed.

DETAILED DESCRIPTION

Technical Problem

A purpose of the inventive concept is to provide a central processing unit having an improved GPU simulation speed and a computing system including the same. Further, other purpose of the inventive concept is to provide a GPU simulation method with an improved speed.

Technical Solution

In order to achieve the above-mentioned purpose, a method of performing a graphic processing unit (GPU) simulation for a central processing unit with a plurality of cores may include generating a main thread and associating the main thread with one of the plurality of cores, generating a plurality of worker threads and associating the worker threads with the cores, allocating simulation operations on operation units of the GPU to the worker threads according to control from the main thread, performing the allocated simulation operations on the worker threads and outputting simulation data, and generating synchronization data on the main thread based on the simulation data.

In an embodiment, the main thread may be an upper thread of the worker threads.

In an embodiment, the generating of the plurality of the worker threads may comprise generating worker threads based on the number of the cores.

In an embodiment, the generating of the plurality of the worker threads may comprise generating as many worker threads as the number of remaining ones of the cores, except the core associated with the main thread.

In an embodiment, the associating of the worker threads with the cores may be performed according to control of the main thread.

In an embodiment, the associating of the worker threads with the cores may comprise associating the worker threads with remaining ones of the cores, except the core associated with the main thread.

In an embodiment, the generating of the synchronization data may comprise storing the output simulation data and generating the synchronization data based on the stored simulation data.

In an embodiment, the generating of the synchronization data may comprises generating the synchronization data based on the stored simulation data, when the allocated simulation operations are finished.

Other aspects of the inventive concept relate to a central processing unit (CPU) including a plurality of cores (Multi Core). A central processing unit (CPU) according to embodiments of the inventive concept may include an upper core associated with a main thread and a plurality of lower cores associated with at least one worker thread. The at least one worker thread performs simulation operations on operation units of a graphic processing unit (GPU) to generate simulation data, and the main thread allocates the simulation operations on the operation units of the GPU to the at least one worker thread and generates synchronization data based on the simulation data.

In an embodiment, the main thread may be an upper thread of the at least one worker thread.

In an embodiment, the main thread generates the at least one worker thread based on the number of the lower cores.

In an embodiment, the main thread may generate as many worker threads as the number of the lower cores.

In an embodiment, the upper core may store the generated simulation data and the main thread generates the synchronization data based on the stored simulation data.

In an embodiment, the main thread may generate the synchronization data based on the stored simulation data, when the simulation operations on the operation units of the GPU are finished.

A computing system according to embodiments of the inventive concept may include a central processing unit (CPU) including a plurality of cores (Multi Core) and a random access memory (RAM) storing a graphic processing unit (GPU) simulation code. The central processing unit may include an upper core associated with a main thread and a plurality of lower cores associated with at least one worker thread, the main thread allocates simulation operations on operation units of a graphic processing unit (GPU) to the at least one worker thread and generates synchronization data based on simulation data generated from the at least one worker thread, and the at least one worker thread performs the simulation operations on the operation units of the GPU allocated thereto to generate the simulation data.

In an embodiment, the main thread may generate the at least one worker thread based on the number of the lower cores.

In an embodiment, the main thread may load the GPU simulation code.

In an embodiment, the main thread may allocate the simulation operations on the operation units of the GPU to the at least one worker thread, based on the GPU simulation code.

In an embodiment, the RAM may store the simulation data generated from the at least one worker thread.

In an embodiment, the RAM may provide the simulation data to the upper core, when the simulation operations on the operation units of the GPU are finished in the at least one worker thread.

In an embodiment, the main thread may generate the synchronization data based on the simulation data, when the simulation operations on the operation units of the GPU are finished.

Advantageous Effects

According to embodiments of the inventive concept, a central processing unit may generate worker threads that are associated with a plurality of cores and perform GPU simulation in a parallel manner on the worker threads. Thus, a central processing unit having an improved GPU simulation speed and a computing system including the same may be provided. Further, GPU simulation method with an improved speed may be provided.

DETAILED DESCRIPTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification.

As used herein, the phrase at least one of A, B, and C should be construed to mean a logical (A or B or C), using a non-exclusive logical or. It should be understood that steps within a method may be executed in different order without altering the principles of the present disclosure.

Figure 1:
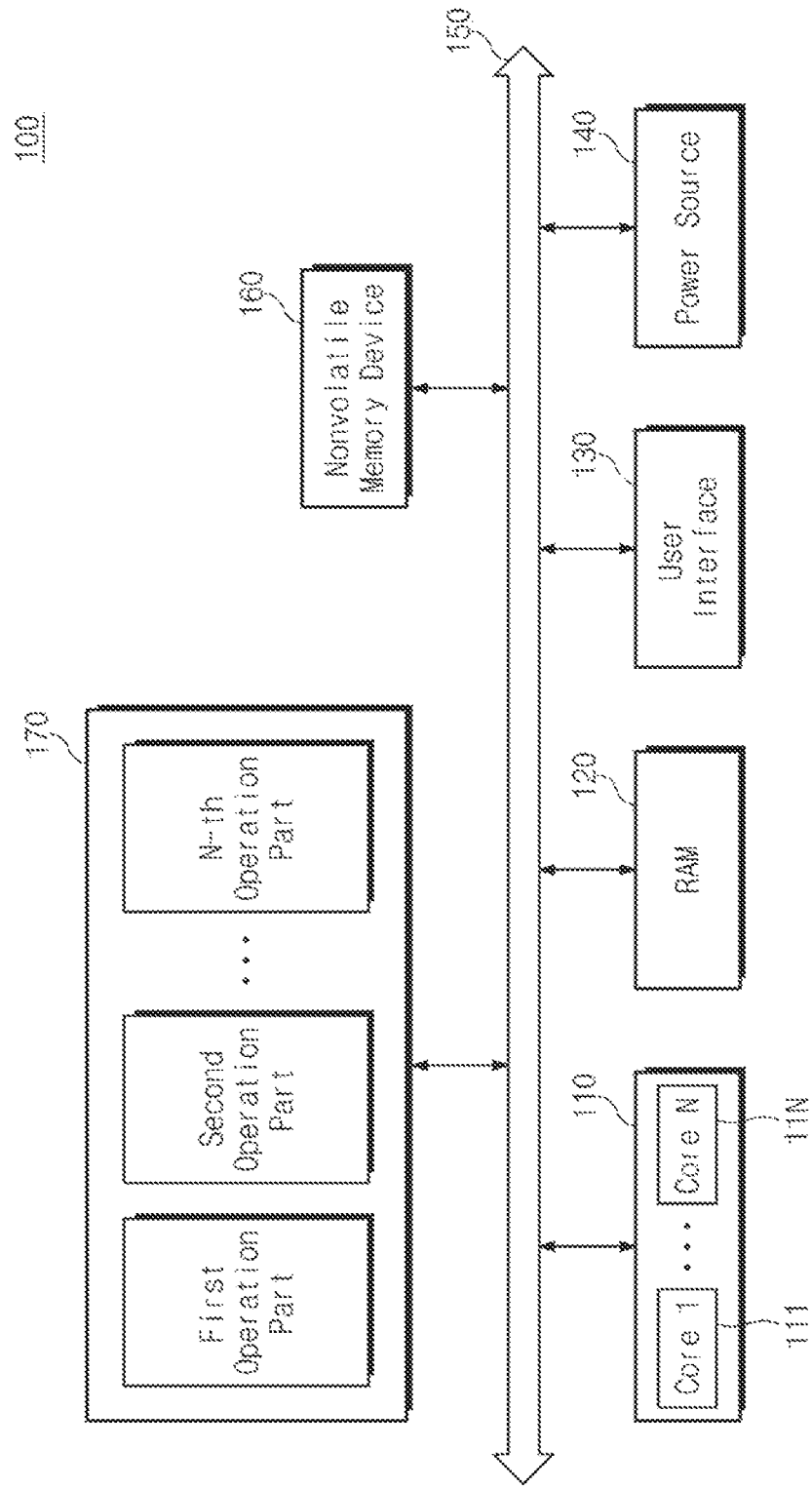
FIG. 1 is a block diagram illustrating a computing system.

Hereinafter, embodiments of the present invention will be described in detail with reference to the accompanying drawings which form a part hereof FIG. 1 is a block diagram illustrating a computing system 100. Referring to FIG. 1, the computing system 100 may include a central processing unit (CPU) 110, a random access memory (RAM) 120, a user interface 130, a power source 140, a system bus 150, a nonvolatile memory device 160, and a graphic processing Unit (GPU) 170.

The CPU 110 may include 1st to N-th cores 111-11N (where N is a natural number). In other words, the CPU 110 may include a plurality of cores. For example, the CPU 110 may be configured to include four cores, but example embodiments of the inventive concepts may not be limited thereto.

The CPU 110 may be configured to control an overall operation of the computing system 100. Data processed by the CPU 110 or the GPU 170 may be stored in the nonvolatile memory device 160. Data transferred through the user interface 130 may be stored in the nonvolatile memory device 160. The user interface 130 may be configured to receive data from a user and send it to the computing system 100.

The RAM 120 may store data processed in the CPU 110 or the GPU 170. Data stored in the RAM 120 may be provided to the CPU 110 or the GPU 170 in response to request from the CPU 110 or the GPU 170. For example, the CPU 110 or the GPU 170 may be configured to load data stored in the RAM 120, perform an operation to process the loaded data, and update data stored in the RAM 120 based on data produced in the operation. The RAM 120 may be configured to load and store data from the nonvolatile memory device 160.

Reading and writing speeds of data may be faster in the RAM 120 than in the nonvolatile memory device 160. Data stored in the nonvolatile memory device 160 can be preserved even when there is power interruption on the computing system 100, but data stored in the RAM 120 may not be preserved when there is power interruption on the computing system 100. Before a specific operation is performed in the CPU 110, data associated with the specific operation may be loaded from the nonvolatile memory device 160 to the RAM 120. The CPU 110 may operate the specific operation using data stored in the RAM 120.

The system bus 150 may be configured to enable data communication between elements constituting the computing system 100. In the case where the system bus 150 is an advanced graphics port (AGP) bus, there may be a difficulty in sending huge amounts of graphic data to the GPU. In this case, the graphic data may be stored in a local memory, which may be provided in the GPU, without passing through the AGP bus.

The GPU 170 may be electrically connected to the CPU 110, the RAM 120, the user interface 130, the power source 140, and the nonvolatile memory device 160 via the system bus 150. The GPU 170 may be configured to process graphic data. The GPU 170 may be configured to receive data through the system bus 150. The GPU 170 may also be configured to produce graphic and video image, which may be displayed on a monitor (not shown) or a different display device.

The GPU 170 may be a general purpose GPU or a General Purpose computation on Graphic processing Unit. Here, the general purpose GPU means a graphic processing unit, in which not only an operation for displaying the graphic and video image but also an operation to be processed in the CPU 110 may be performed. In other words, the GPU 170 may be configured to perform general purpose operations. For example, the GPU 170 may be configured to process effectively applications, in which large data with high parallelism and low mutual dependence are used. For example, the computing system 100 may include one or more GPUs.

According to certain embodiments of the inventive concept, the computing system 100 may be configured to process general purpose operations, without the GPU 170. Although the GPU 170 is not included in the computing system 100, simulation may be performed to operation units, which will be described in detail with reference to FIG. 2, contained in the GPU 170 to generate a virtual GPU.

Figure 2:
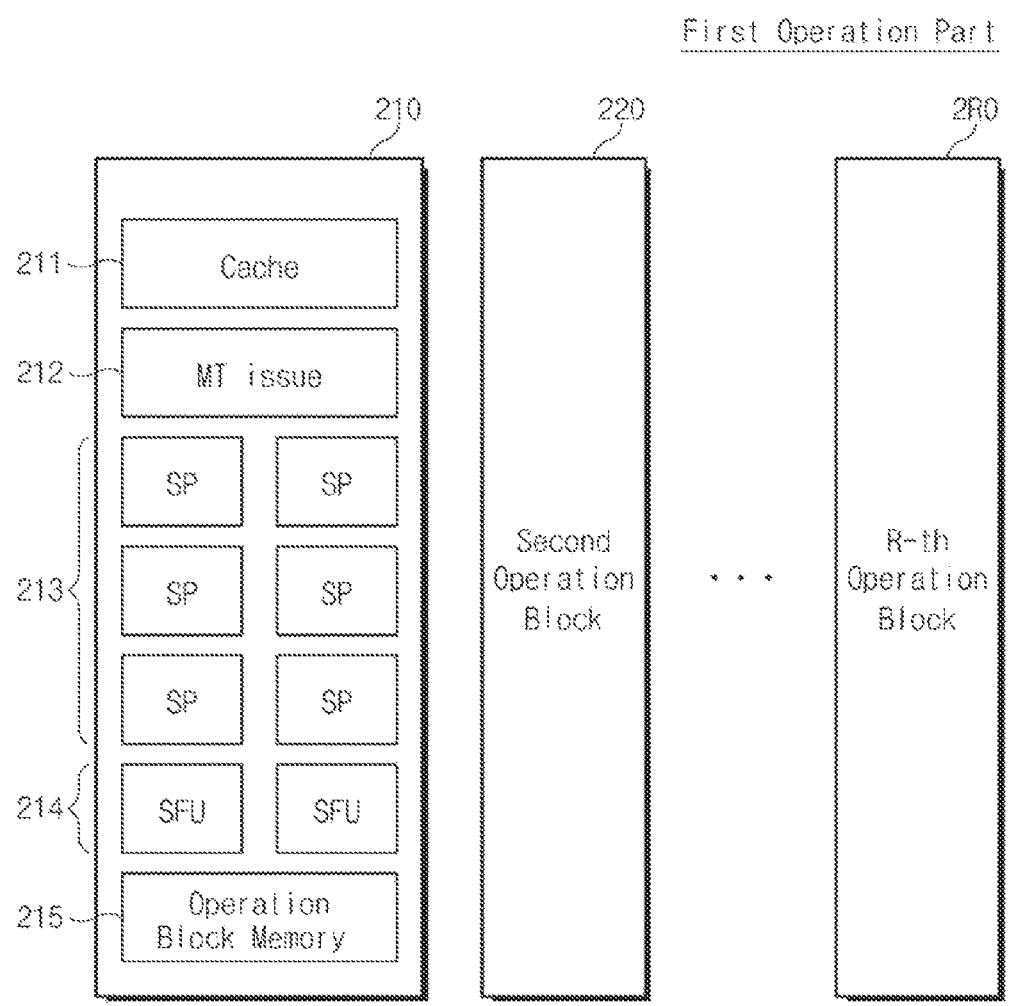
FIG. 2 is a block diagram illustrating a first operation part of a GPU of FIG. 1.

FIG. 2 is a block diagram illustrating a first operation part 200 of the GPU 170 of FIG. 1. The first operation part 200 may include 1st to R-th operation blocks 210-2R0. The first operation block 210 may include a cache 211, a multithread issue block 212, a plurality of scalar processor (SP) blocks 213, super function unit (SFU) blocks 214, and an operation block memory 215. Although not shown in FIG. 2, each of the 2nd to R-th operation blocks 220-2R0 may be configured in the same manner as the 1st operation block 210.

The cache 211 may store data to be processed in the SP blocks 213 and the SFU blocks 214. The multithread issue block 212 may store an operator to be processed in the SP blocks 213 and the SFU blocks 214.

The SP blocks 213 may be configured to perform simple operations, compared with that in the SFU blocks 214. For example, each of the SP blocks 213 may be configured to perform arithmetic logic operations. The SFU blocks 214 may be configured to perform special operations, which are difficult to be performed in the SP blocks 213. For example, the SFU blocks 214 may be configured to perform square root calculation, exponentiation, trigonometric calculation, and so forth. The operation block memory 215 may store data processed by the SP blocks 213 and the SFU blocks 214. Data stored in the operation block memory 215 may be output to the outside in response to request from the outside.

Data stored in the cache 211 may transmitted to the multithread issue block 212. The multithread issue block 212 may be configured to allocate the operator stored in the multithread issue block 212 and the data transmitted from the cache 211 to the SP blocks 213 and the SFU blocks 214. The SP blocks 213 and the SFU blocks 214 may process received operator and data. The processed data may be stored in the operation block memory 215. The data stored in the operation block memory 215 may be output to the outside in response to a request signal (not shown) from the outside. Hereinafter, the SP blocks 213 and the SFU blocks 214 will be referred as to "GPU operation units".

As shown in FIG. 2, each of the GPU operation units of the first operation block 210 may be configured to process data allocated thereto. In other words, the first operation block 210 may process data in a parallel manner. Similarly, each of the first to R-th operation blocks 210-2R0 provided in the first operation part 200 may process data allocated thereto. Similarly, the first to N-th operation parts provided in the GPU 170 may process data allocated thereto. As a result, GPU 170 can perform efficiently operation in the case that data to be processed have high parallelism and low mutual dependence. In the case where virtual GPU 170 is simulated, the GPU operation units may be simulated in a parallel manner. In other words, when simulation to GPU operation units may be performed in the CPU 110, the plurality of the cores 111-11N may be used to perform the parallel simulation on the GPU operation units.

Although one CPU 110 is exemplified in FIG. 1, this configuration is just one example of the inventive concept, and the computing system 100 may be configured to include a plurality of CPUs. In this case, the plurality of CPUs may be used to perform parallel simulation on the GPU operation units.

Figure 3:
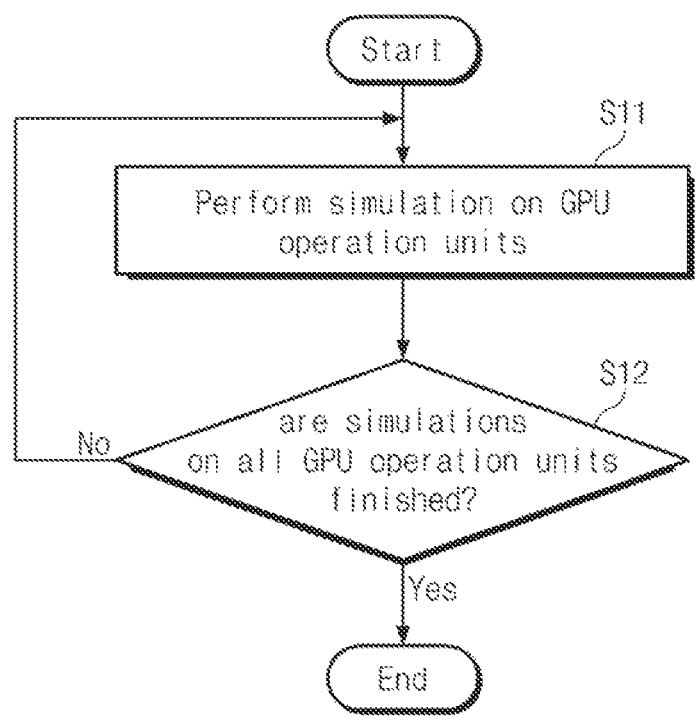
FIG. 3 is a flow chart illustrating a method of performing a simulation on the GPU of FIG. 1.

FIG. 3 is a flow chart illustrating a method of performing GPU simulation. Referring to FIGS. 1 and 3, in a step of S11, simulation on each of the GPU operation units may be performed. For example, in the case where operation to be performed by the GPU 170 is called in the computing system 100, a GPU simulation code may be executed to performed simulations on the GPU operation units. As the simulations go on, the virtual GPU 170 may be produced.

In a step of S12, it may be checked whether simulations on all of the GPU operation units may be finished. If the simulations on all of the GPU operation units are not finished, the simulation on the unfinished operation unit may be further performed, in a step of S11. If the simulations on all of the GPU operation units are finished, the simulation may be terminated. If one core is merely used to perform the simulation on the operation units, an effective GPU simulation running time may not be guaranteed.

Figure 4:
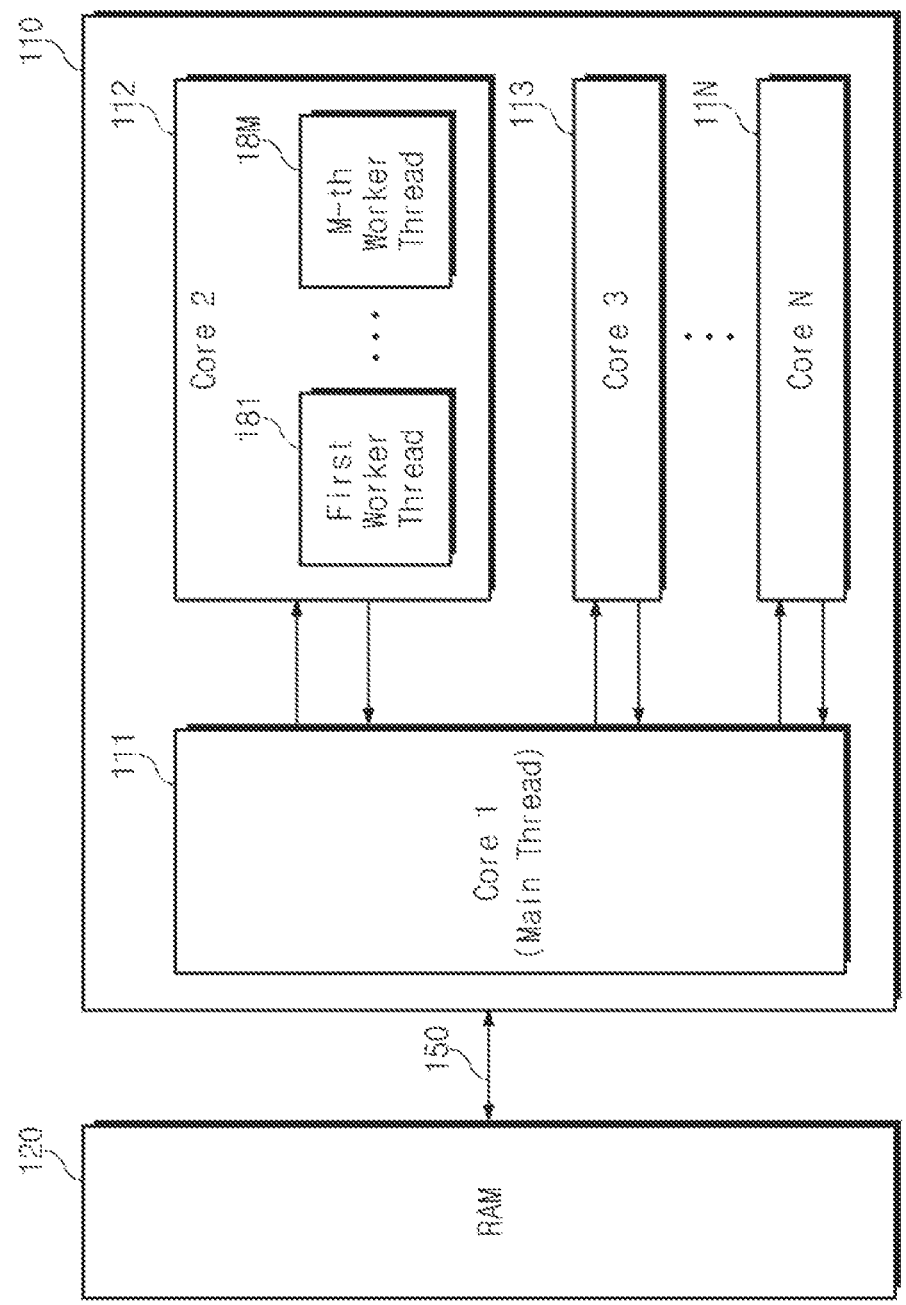
FIG. 4 is a block diagram illustrating a central processing unit, a random access memory, and a system bus.

FIG. 4 is a block diagram illustrating the CPU 110, the RAM 120 and the system bus 150. Referring to FIGS. 1 and 4, the CPU 110 and the RAM 120 may be electrically connected to each other through the system bus 150. The central processing unit 100 may include a plurality of cores 111-11N. The RAM 120 may be configured to store a GPU simulation code.

For example, the GPU simulation code may be stored in the nonvolatile memory device 160. In the case where operation to be processed by the GPU 170 is called in the computing system 100, the GPU simulation code stored in the nonvolatile memory device 160 (e.g., of FIG. 1) may be loaded on the RAM 120. Next, the CPU 110 may load the GPU simulation code thereon from the RAM 120 and perform simulations on the GPU operation units using the loaded GPU simulation code. Unlike in FIG. 4, the GPU simulation code may be directly loaded on CPU 110 from the nonvolatile memory device 160. The CPU 110 may execute simulations on the GPU operation units using one of a plurality of the cores.

The GPU simulation code may be transmitted to the CPU 110 through the system bus 150. For example, a call signal (not shown) may be generated by the CPU 110, data to be processed may be transmitted from the RAM 120 to the CPU 110 in response to the generated call signal.

The CPU 110 may be operated in units of threads. For example, the thread may be generated by an operation system (OS). The CPU 110 may generate the thread, dispose the thread to a core having a small computational amount, and perform an operation in the thread. In the case where data are processed by the plurality of the core 111-11N, the thread may be disposed to one of the plurality of the cores 111-11N that has the smallest computational amount.

The core associated with each thread may produce lower threads of each thread. The produced lower threads may be associated with one of the plurality of the cores 111-11N. Here, the thread associated with the core producing the produced lower threads may be referred to as a "main thread".

In other words, the core associated with the main thread may generate a plurality of the lower threads. The generated lower threads may be associated with one of the plurality of the cores (the second to N-th core 112-11N of FIG. 4), except the core associated with the main thread. For example, if the CPU 110 includes eight cores, a plurality of the lower threads may be generated by each of seven cores, except a core associated with the main thread. Although in FIG. 4 the first core 111 is shown to be associated with the main thread, this configuration is just one example of the inventive concept, and one of the second to N-th cores 112-11N may be associated with the main thread.

According to example embodiments of the inventive concept, the core associated with the main thread may generate at least one lower thread (hereinafter, referred to as a "worker thread") based on the number of the cores of the CPU 110. The core associated with the main thread may control the GPU simulation. The core associated with each worker thread may perform simulation on the GPU operation unit.

The number of the worker threads may be determined by the number of the cores of the CPU 110. The core associated with the main thread may allocate each worker thread to the remaining cores 112-11N of the CPU 110, except the core 111 associated with the main thread. Referring to FIG. 4, the first to M-th worker threads 181-18M may be allocated to a second core 172. Similarly, although not shown in FIG. 4, the worker threads may be allocated to each of third to N-th cores 113-11N. Further, the core associated with the main thread may allocate the simulation operations on the GPU operation units to worker threads, respectively.

Figure 5:
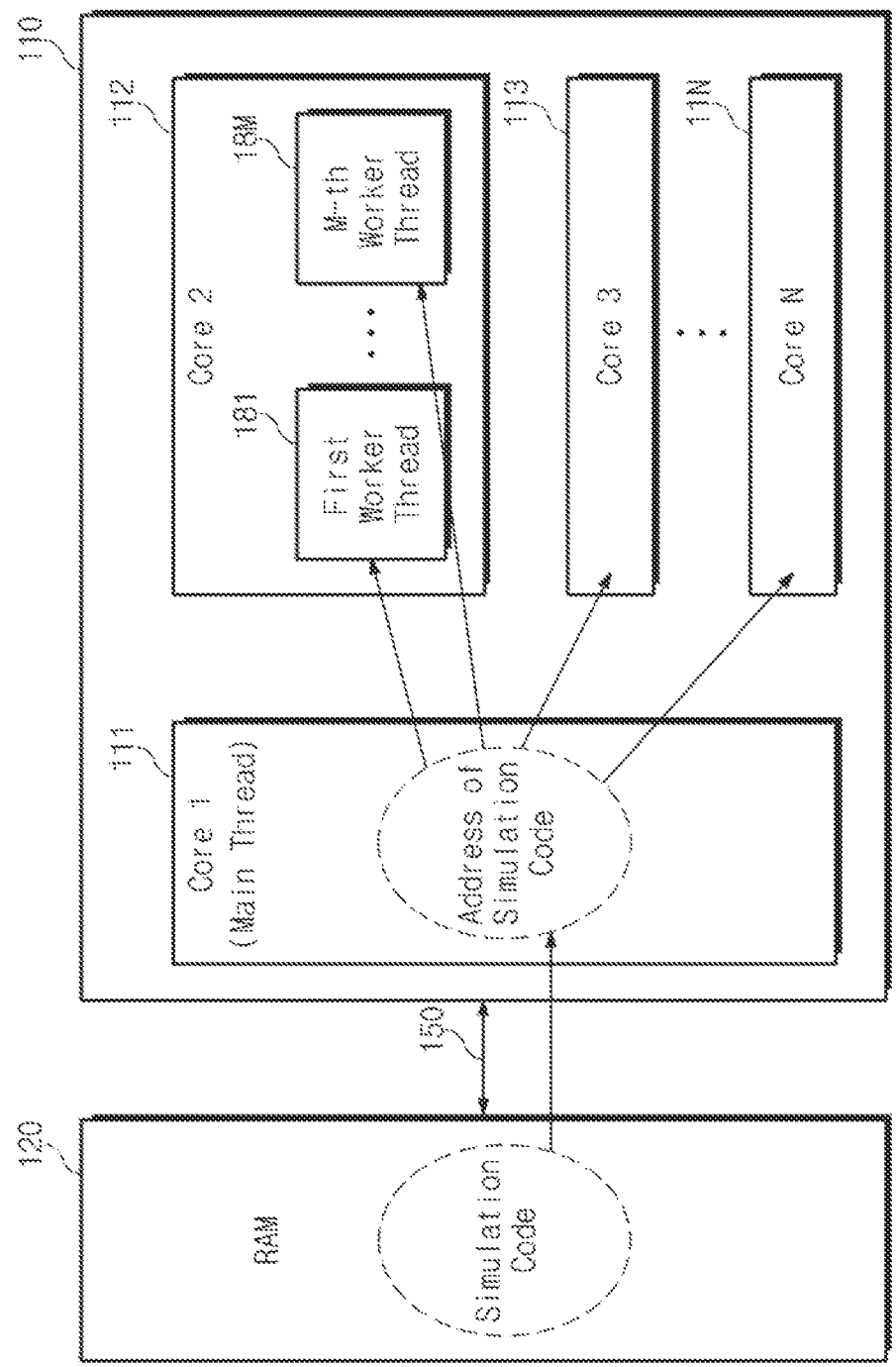
FIGS. 5 through 7 are block diagrams illustrating a method of processing data of a main thread and worker threads.
Figure 6:
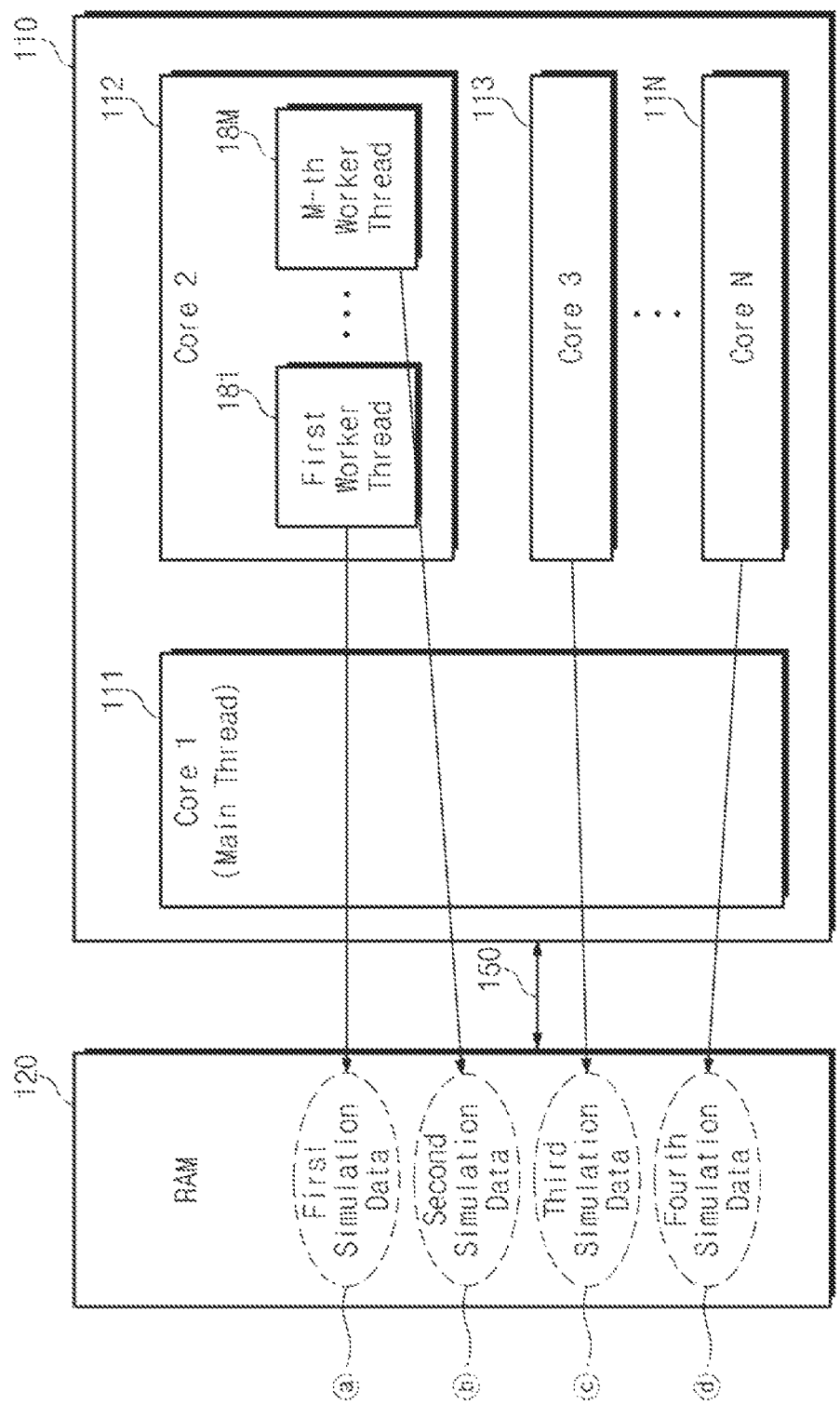
Figure 7:
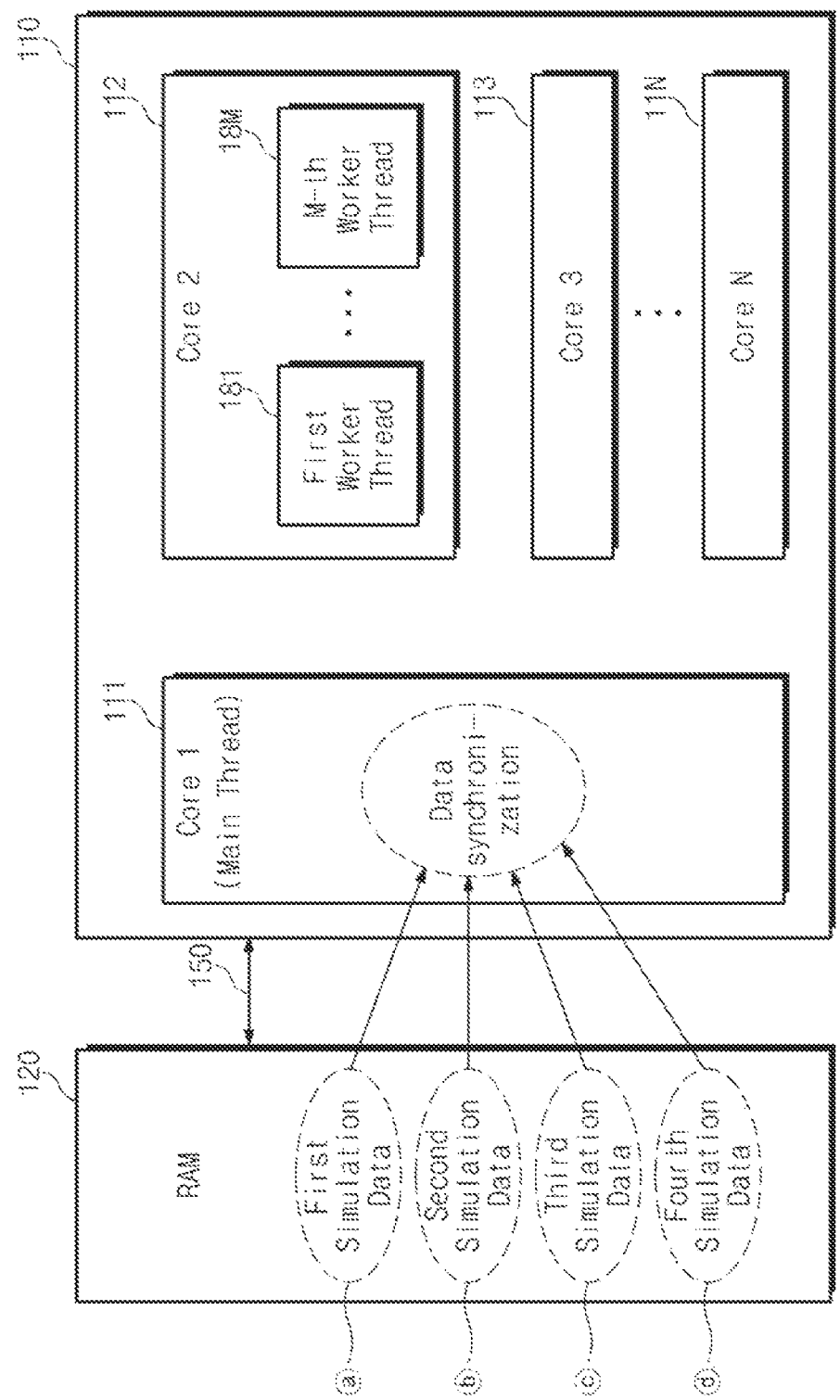

FIGS. 5 through 7 are block diagrams illustrating a method of processing data of a main thread and worker threads. Referring to FIG. 5, the GPU simulation code may be stored in the RAM 120. The first core 111 may allocate simulation operations on the GPU operation units to the worker threads, respectively, based on the GPU simulation code. For example, the first core 111 may transmit address information of the GPU simulation code to each worker thread, based on the GPU simulation code.

For example, the simulation operations on the GPU operation units may be allocated to the first to M-th worker threads 181-18M of the second core 172, to the worker threads (not shown) of the third core 113, and to the worker threads (not shown) of the N-th core 11N, respectively.

The worker threads may receive the GPU simulation code from the RAM 120, to perform the allocated simulation operations. For example, the main thread may transmit address information associated with the allocated simulation operations to the worker threads. Each worker thread may request the GPU simulation code associated with the address information from the RAM 120, based on the received address information.

Referring to FIG. 6, data simulated by each worker thread may be sent to the RAM 120. A first simulation data (a) may be sent from the first worker thread 181 to the RAM 120. A second simulation data (b) may be sent from the M-th worker thread to the RAM 120. A third simulation data (c) and a fourth simulation data (d) may be sent to the RAM 120 from the worker thread (not shown) of the third core 113 and from the worker thread of the N-th core 11N, respectively. Similarly, data simulated by worker threads (not shown) in FIG. 6 may also be sent to the RAM 120.

The cores associated with the worker threads may send the simulation data to the RAM 120 and send simulation completion signals to the first core 111 to which the main thread is allocated. If all of the simulations allocated to the worker threads are determined to be completed, based on the completion signals, the first core 111 may load the simulation data from the RAM 120.

Referring to FIG. 7, the first core 111 may synchronize data simulated by each worker thread. That is, the first core 111 may synchronize simulation data on the main thread.

If simulation is performed on one core, it is unnecessary to perform an additional synchronization. In other words, if simulation is performed on one core, data generated from the simulation on the GPU operation units may be stored in the RAM 120. And the stored data may be updated until the simulation is finished. Accordingly, data on the virtual GPU may be loaded on the RAM 120 when the simulation is finished, and thus, it is unnecessary to perform an additional synchronization.

By contrast, in the case where the simulation on the GPU operation units are performed on the plurality of the worker threads, each worker thread may perform simulation on a specific GPU simulation code allocated thereto. Data generated from each worker thread may be sent to the RAM 120. The core associated with the main thread may synchronize simulation results on the GPU operation units that are separately performed. That is, the core associated with the main thread may collect and synchronize simulation data on the GPU operation units that are stored in the RAM 120, so as to make unified simulation data. The synchronized data may constitute data on the virtual GPU.

Referring to FIG. 7, in the case where data simulated from each worker thread are sent to the RAM 120, the main thread may load the first to fourth simulation data (a-d) from the RAM 120. A process of synchronizing the loaded data may be performed. The synchronization of the simulation data may be performed, when all of the simulations on the GPU operation units allocated to the worker threads are finished. Further, although not shown in FIG. 7, the synchronized data may be sent to the RAM 120.

Figure 8:
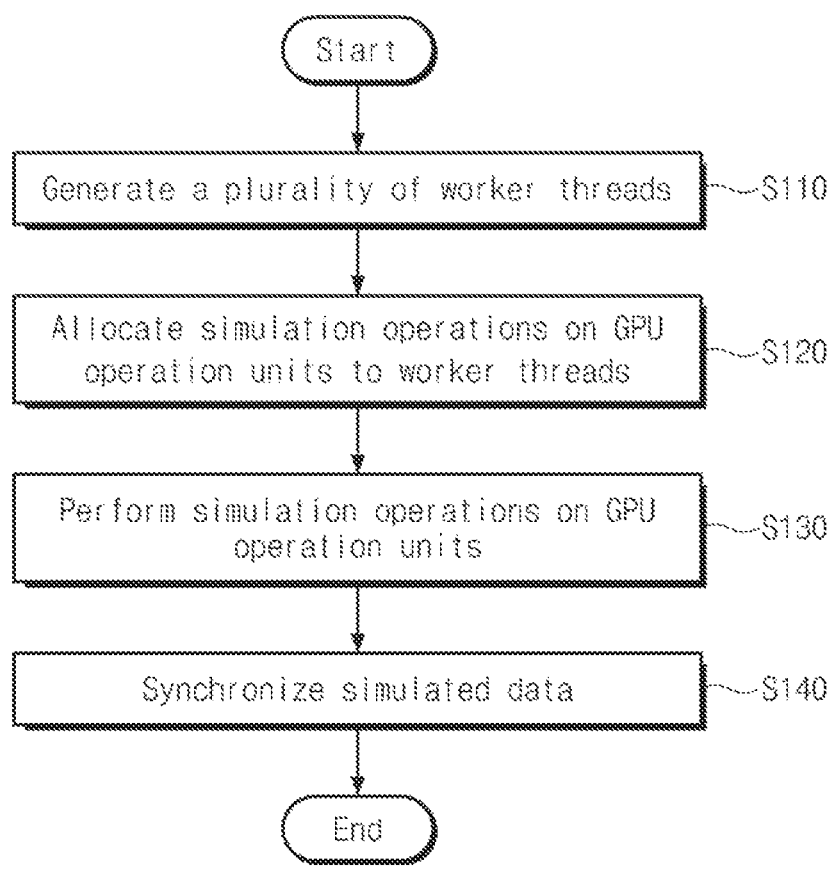
FIG. 8 is a flow chart illustrating a method of performing GPU simulation, according to example embodiments of the inventive concept.

FIG. 8 is a flow chart illustrating a method of performing GPU simulation, according to example embodiments of the inventive concept. Referring to FIGS. 4 and 8, in a step of S110, the core associated with the main thread may generate a plurality of worker threads. The main thread may be associated with one of the cores of the CPU 110. The plurality of the worker threads may be associated with the remaining cores that may not be associated with the main thread. For example, if the CPU 110 includes eight cores, M worker threads may be generated in each of seven cores, except the core associated with the main thread. In example embodiments, the main thread may generate as many worker threads as the number of the cores of the CPU 110 that may not be associated with the main thread. For example, if the CPU 110 includes eight cores, seven worker threads may be generated.

The core associated with the main thread may allocate simulation operations on the GPU operation units (for example, see FIG. 2) to the worker threads, in a step of S120. And the simulation on the GPU operation units may be performed on each of the worker threads, in a step of S130.

In a step of S140, the core associated with the main thread may synchronize data simulated by the worker threads. In example embodiments, the data simulated by the worker threads may be transmitted to the main thread, and the core associated with the main thread may synchronize the simulated data. For example, the data simulated by the worker threads may be stored in the RAM 120 (e.g., see FIG. 4), and if all of the simulation operations on the GPU operation units are finished, the data stored in the RAM 120 may be transmitted to the main thread, and a process of synchronizing the data transmitted from the RAM 120 may be performed. For example, the core associated with each worker thread may send a completion signal to the main thread, when the simulated data are sent to the RAM 120. If the completion signal is received from every worker thread, the core associated with the main thread may send a data request signal to the RAM 120 and receive data from the RAM 120.

Figure 9:
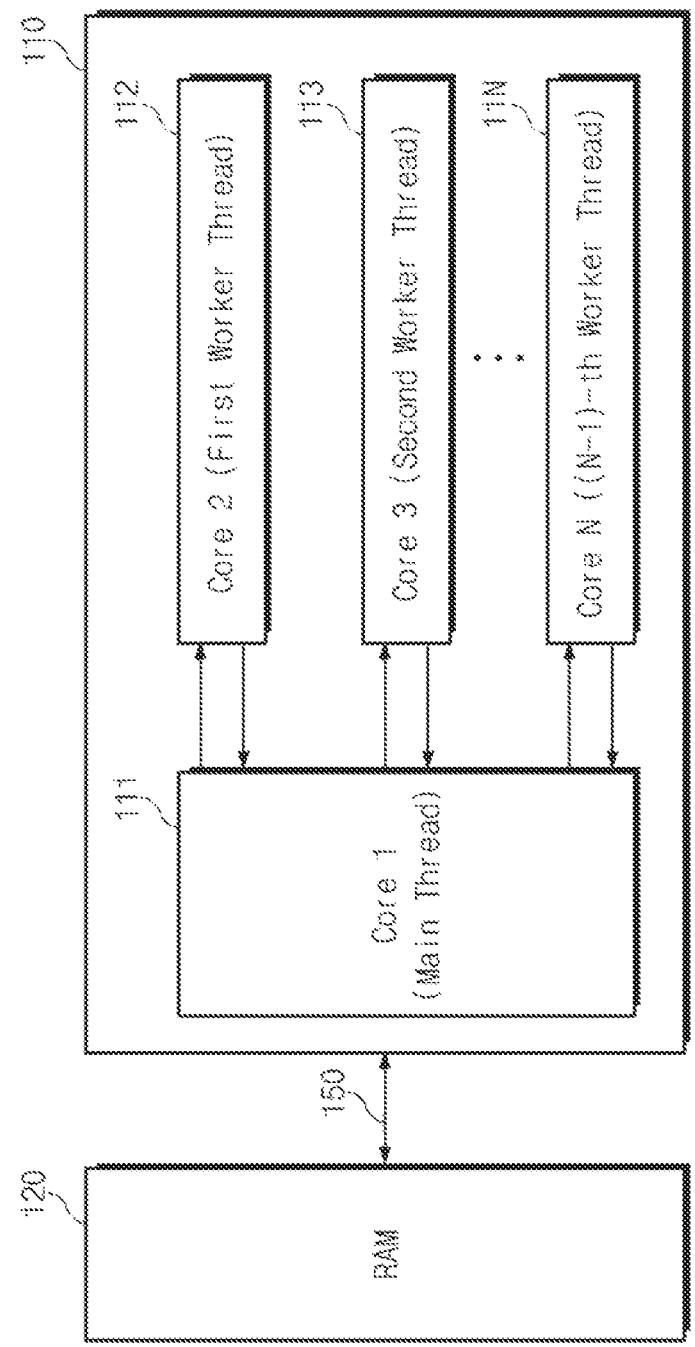
FIG. 9 is a block diagram illustrating a case, in which one core is associated with one worker thread, according to other example embodiments of the inventive concept.

FIG. 9 is a block diagram illustrating a case, in which one core is associated with one worker thread, according to other example embodiments of the inventive concept. Referring to FIG. 9, the main thread may be associated with the first core 111. The first to (N−1)-th worker threads may be associated with the second to N-th cores 112-11N, respectively. The main thread may allocate simulation operations on GPU operation units to the first to (N−1)-th worker threads, respectively. The first to (N−1)-th worker threads may perform the simulation operation allocated thereto. The main thread may perform a process of synchronizing data that are simulated by the first to (N−1)-th worker threads.

[Mode for the Invention]

According to embodiments of the inventive concept, worker threads associated with a plurality of cores may be generated, and simulation may be performed in a parallel manner on the worker threads. As the number of the cores contained in a central processing unit increases, a speed of the simulation may be improved. Accordingly, according to embodiments of the inventive concept, a GPU simulator with an improved speed may be provided.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

The invention claimed is:

1. A single processor including a plurality of cores, comprising:
an upper core allocated with a main thread; and
a plurality of lower cores, each of the plurality of the lower cores being allocated with at least one worker thread,
wherein the single processor does not include a general purpose graphic processing unit (GPGPU),
the upper core and the plurality of lower cores do not include a graphic processing unit (GPU),
the single processor loads a GPU simulation code from a random access memory (RAM) or a nonvolatile memory device through a system bus,
the upper core transmits address information of the GPU simulation code associated with allocated simulation operations to the lower cores, based on the GPU simulation code,
each worker thread requests the GPU simulation code associated with the address information from the RAM, based on the received address information,
the plurality of the lower cores perform simulation operations on operation units of a virtual graphic processing unit (GPU), in the respective at least one worker thread, to generate simulation data, and
the upper core allocates the simulation operations on the operation units of the virtual GPU to the plurality of the worker threads and generates synchronization data based on the generated simulation data.

2. The single processor of claim 1, wherein the main thread is an upper thread of the worker threads.

3. The single processor of claim 1, wherein the upper core generates the plurality of the worker threads based on the number of the lower cores.

4. The single processor of claim 3, wherein the upper core generates as many worker threads as the number of the lower cores.

5. The single processor of claim 1, wherein the upper core generates the synchronization data based on the simulation data, when the simulation operations on the operation units of the virtual GPU are terminated.

6. A computing system, comprising:
a single processor; and
a random access memory (RAM) storing a graphic processing unit (GPU) simulation code,
wherein the single processor comprises:
an upper core associated with a main thread; and
a plurality of lower cores, each of the plurality of the lower cores being allocated with at least one worker thread,
wherein the single processor does not include a general purpose graphic processing unit (GPGPU), and the computing system does not include a GPU,
wherein the single processor loads the GPU simulation code from the RAM through a system bus,
the upper core transmits address information of the GPU simulation code associated with allocated simulation operations to the lower cores, based on the GPU simulation code,
each worker thread requests the GPU simulation code associated with the address information from the RAM, based on the received address information,
the plurality of the lower cores perform simulation operations on operation units of a virtual GPU, in the respective at least one worker thread, to generate simulation data, and
the upper core allocates the simulation operations on the operation units of the virtual GPU to a plurality of worker threads based on the GPU simulation code and generates synchronization data based on the generated simulation data.

7. The system of claim 6, wherein the synchronization data constitutes data on the virtual GPU.

8. The system of claim 6, wherein the upper core generates the plurality of worker threads based on the number of the lower cores.

9. The system of claim 6, wherein the RAM stores the simulation data generated in the plurality of worker threads.

10. The system of claim 6, wherein the RAM provides the simulation data generated in the simulation operations to the upper core, when the simulation operations on the operation units of the virtual GPU are terminated.

11. The system of claim 6, wherein the generated synchronization data is stored in the RAM.

12. The system of claim 6, wherein the upper core generates the synchronization data based on the simulation data, when the simulation operations on the operation units of the virtual GPU are terminated.

13. A method of performing a virtual graphic processing unit (GPU) simulation using a single processor with a plurality of cores, the method comprising:
generating a main thread and associating the main thread with one of the plurality of cores;
generating a plurality of worker threads and associating the plurality of the worker threads with remaining ones of the plurality of the cores, except the core associated with the main thread;
allocating simulation operations on operation units of the virtual GPU to the plurality of worker threads, according to a control from the core associated with the main thread;

performing the allocated simulation operations on the plurality of worker threads to generate simulation data; and synchronizing the simulation data on the main thread, wherein the plurality of cores do not include a graphic processing unit (GPU), and wherein allocating simulation operations includes:

loading a GPU simulation code from a random access memory (RAM) or a nonvolatile memory device through a system bus, by the single processor, the single processor does not include a general purpose graphic processing unit (GPGPU), transmitting address information of the GPU simulation code associated with the simulation operations to the remaining ones of the plurality of cores, based on the GPU simulation code, by the one of the plurality of cores, and requesting the GPU simulation code associated with the address information from the RAM, based on the received address information, by each of the remaining ones of the plurality of the cores.

14. The method of claim 13, wherein the generating of the plurality of the worker threads comprises generating the worker threads based on the number of the cores.

15. The method of claim 14, wherein the synchronizing comprises synchronizing stored simulation data, when the allocated simulation operations are finished by the plurality of worker threads.

* * * * *